2,828,328

MONOALKYLAMINOALKYL 3-ALKOXY-4-AMINOBENZOATES

John L. Schmidt, Highland Park, and Marjorie B. Moore, Maynette R. Vernsten, and Morris Freifelder, Waukegan, Ill., assignors to Abbott Laboratories, North Chicago, Ill., a corporation of Illinois No Drawing. Application March 21, 1955
Serial No. 495,754

6 Claims. (Cl. 260—472)

The present invention relates to monoalkylaminoalkyl esters and more particularly to mono lower alkylaminoalkyl esters of benzoic acids containing both an amino and a lower alkoxy group on the benzene nucleus.

The compounds of the present invention have the following general formula:

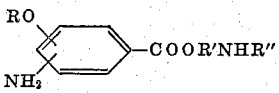

wherein R is a lower alkyl group, R' is a bivalent lower hydrocarbon radical, and R" is a lower alkyl group. The compounds having the foregoing general formula exhibit superior local anesthetic properties and are preferably used in the form of their water soluble salts with nontoxic acids.

Monoalkylaminoalkyl esters having the above general formula can be prepared in highly purified form substantially free of the corresponding amide products by introducing a hydrogenolyzable group into a monoalkylaminoalkanol on the nitrogen atom thereof, such as benzylating the said aminoalkanol, and thereafter reacting the thus substituted aminoalkanol with the desired acylating agent, such as benzoyl chloride. The foregoing reaction product is then subjected to a reducing atmosphere in which the said benzyl or other hydrogenolyzable group is removed from the nitrogen atom of the amino group and replaced by hydrogen to form a desired mono substituted alkylaminoalkyl ester. Among the hydrogenolyzable groups which have been found most satisfactory in the present invention are the benzyl group and carbobenzoxy group.

In accordance with one procedure for preparing the herein disclosed monoalkyl product, an aminoalkanol is first alkylated to provide the desired monoalkyl substituted aminoalkanol and thereafter the monoalkyl substituted aminoalkanol is catalytically reductively alkylated by reacting with benzaldehyde or a substituted benzaldehyde to provide the nitrogen atom of the said aminoalkanol with a hydrogenolyzable group which protects the amino group when the said alkanol is reacted with the desired acyl halide to form an ester. It is also possible to react an aminoalkanol with benzaldehyde or a substituted benzaldehyde to form an N-benzylaminoalkanol and thereafter alkylating the said benzylaminoalkanol to introduce therein the desired monoalkyl substituent in the usual manner. In anothre procedure for preparation of benzylalkylaminoalkanols, benzylalkylamine compounds are reacted with alkylene oxides such as ethylene oxide, propylene oxide, and the like to form benzylalkylaminoethanol and benzylalkylaminoisopropanol, respectively. The aminoalkanol can also be provided with other hydrogenolyzable groups, such as benzhydryl, α- or β-menaphthyl, nuclear substituted carbobenzoxy, such as p-bromcarbobenzoxy, carbo-allyloxy, and carbobenzoxy, by reacting the aminoalkanol or N-monoalkylaminoalkanol with carbobenzoxy chloride to form the N-alkyl-N-carbobenzoxyaminoalkanol which has the amino group protected by the hydrogenolyzable carbobenzoxy group, thereby enabling the said alkanol to be reacted with benzoyl chloride or a substituted benzoyl chloride or any other acyl halide to form an ester without forming the undesired amide product. It will be further understood that the compounds of this invention can also be obtained by the conventional methods without the intervention of a hydrogenolyzable group, as illustrated by Example III. The amides formed by reaction of secondary aminoalkanols with the nitro acid chlorides can also be rearranged by acids to form the esters.

In the following specific examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

EXAMPLE I 2-(n-propylamino)ethyl 3-amino-4-n-butoxybenzoate hydrochloride $$\text{n-C}_4\text{H}_9\text{O}-\underset{\text{NH}_2}{\underset{|}{\bigcirc}}-\overset{\text{O}}{\underset{\|}{\text{C}}}-\text{OCH}_2\text{CH}_2-\text{NHC}_3\text{H}_7(\text{n}).\text{HC}$$

(a) 2-(benzyl-n-propylamino)ethanol: To 75.5 g. β-benzylaminoethanol (0.5 mole) dissolved in 50 cc. methanol is added 58 g. propionaldehyde (1.0 mole). The solution is refluxed for 20 minutes and concentrated under reduced pressure to remove volatile materials. Thereafter 50 cc. methanol is added to the residue and the solution is hydrogenated under a pressure of 50 pounds per square inch in the presence of platinum oxide. Upon the completion of the reduction, the reaction mixture is filtered and the product, 2-(benzyl-n-propylamino)ethanol, is distilled at a temperature of 155–165° C. under a pressure of 22 mm. and exhibits a refractive index of $n_D^{25}$ 1.5110. Upon analysis the said aminoethanol product is found to contain 74.90% C, 9.84% H, and 6.98% N, as compared with theoretical values of 74.57% C, 9.91% H, and 7.25% N.

(b) 2-(benzyl-n-propylamino)ethyl 3-nitro-4-n-butoxybenzoate hydrochloride: 2-(benzyl-n-propylamino)ethanol (0.1 mole), prepared as in Example I(a) is dissolved in benzol and thereafter refluxed with stirring with 0.1 mole of 3-nitro-4-n-butoxybenzoyl chloride for about three hours and the reaction mixture is allowed to stand for about 12 hours. The product, 2-(benzyl-n-propylamino)ethyl 3-nitro-4-n-butoxybenzoate hydrochloride, which forms as a crystalline solid melts after recrystallization from isopropanol and dry ether at 115–117° C. and on chemical analysis is found to contain 61.43% C, 7.21% H, and 6.06% N, as compared with theoretical values of 61.25% C, 6.93% H, and 6.21% N.

(c) 2-(n-propylamino)ethyl 3-amino-4-n-butoxybenzoate hydrochloride: 2-(benzyl-n-propylamino)ethyl 3-nitro-4-n-butoxybenzoate hydrochloride (25 g.) is dissolved in 200 cc. of water and 25 cc. of ethyl alcohol and the solution is hydrogenated under a pressure of 32 pounds per square inch in the presence of 3.0 g. of 5% palladium on charcoal. The mixture is filtered, the filtrate treated with benzol and thereafter made alkaline with sodium hydroxide solution. The solution is then extracted with benzol and dried over magnesium sulfate. After filtering the solution, about 0.056 mole of alcoholic hydrochloric acid is added thereto and it is allowed to stand until precipitation is complete. The precipitate is filtered, washed with dry ether and dried thoroughly. The product, 2-(n-propylamino)ethyl 3-amino-4-n-butoxybenzoate hydrochloride, upon recrystallization from ethyl alcohol and thorough drying, has a melting point of 141–142° C. On chemical analysis the said product is found to contain 57.67% C, 7.90% H, and 8.01% N, as compared with theoretical values of 58.08% C, 8.22% H, and 8.47% N.

EXAMPLE II

*2-(ethylamino)ethyl 3-amino-4-n-butoxybenzoate hydrochloride*

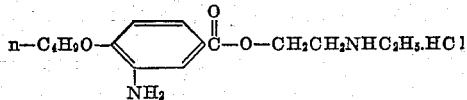

(a) 2-(benzylethylamino)ethanol is prepared by reacting 2-(ethylamino)ethanol with benzaldehyde and hydrogenating according to the procedure described in Example I(a), said ethanol product distilling at a temperature of 148—156° C. at a pressure of 22 mm. and having a refractive index of $n_D^{25}$ 1.5200. On chemical analysis the said product is found to contain 73.66% C, 9.32% H, and 7.72% N, as compared with theoretical values of 73.70% C, 9.56% H, and 7.81% N.

(b) 2-(benzylethylamino)ethyl 3-nitro-4-n-butoxybenzoate hydrochloride is prepared by reacting 2-(benzylethylamino)ethanol with 3-nitro-4-n-butoxybenzoyl chloride as in Example I(b) and has a melting point of 139–141° C. On chemical analysis the said hydrochloride is found to contain 60.69% C, 6.68% H, and 6.23% N, as compared with theoretical values of 60.50% C, 6.69% H, and 6.41% N.

(c) 2-(ethylamino)ethyl 3-amino-4-n-butoxybenzoate hydrochloride is prepared by subjecting 2-(benzylethylamino)ethyl 3-nitro-4-n-butoxybenzoate hydrochloride to hydrogenation in accordance with the procedure described in Example I(c). The said amine product has a melting point of 128–129° C. On chemical analysis the said product is found to contain 57.10% C, 8.03% H, and 8.86% N, as compared with theoretical values of 56.86% C, 7.95% H, and 8.84% N.

EXAMPLE III

*2-(methylamino)ethyl 3-amino-4-n-butoxybenzoate hydrochloride*

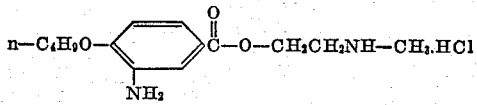

(a) 2-(methylamino)ethyl 3-nitro-4-n-butoxybenzoate hydrochloride: A solution of 23.9 g. (0.1 mole) 3-nitro-4-n-butoxybenzoyl chloride in about 30 cc. chloroform is mixed with a solution of 7.5 g. (0.1 mole) of 2-(methylamino)ethanol in about 30 cc. chloroform which has been cooled and saturated with gaseous hydrogen chloride; the product is then heated at 50–55° C. for about five days under a reflux condenser fitted with a drying tube. The solvent is distilled under vacuum, the residue allowed to stand overnight under dry ether, and the solid precipitate filtered and washed with dry ether. The 2-(methylamino)ethyl 3-nitro-4-n-butoxybenzoate hydrochloride may be further purified by solution in warm isopropanol and precipitation by dry ether.

(b) 2-(methylamino)ethyl 3-amino-4-n-butoxybenzoate dihydrochloride: 2-(methylamino)ethyl 3-nitro-4-n-butoxybenzoate hydrochloride, 14.0 g. (0.042 mole), is dissolved in 125 cc. water and filtered. The solution is hydrogenated under a pressure of 30 pounds per square inch in the presence of 1.5 g. of 5% palladium on charcoal. After reduction is complete, the product is filtered, sodium hydroxide solution is added to pH 10-12 and extracted with benzol. The benzol layer is washed free of alkali and dried over magnesium sulfate. After filtration the solution is treated with alcoholic HCl, the precipitate forms immediately, and is then cooled and filtered. The product, 2-(methylamino)ethyl 3-amino-4-n-butoxybenzoate dihydrochloride, upon recrystallization from absolute alcohol and thorough drying, has a melting point of 204° C. On chemical analysis the product is found to contain 49.36% C, 7.22% H, and 8.13% N, as compared with theoretical values of 49.57% C, 7.13% H, and 8.26% N.

EXAMPLE IV

*2-(isopropylamino)ethyl 3-amino-4-n-butoxybenzoate hydrochloride*

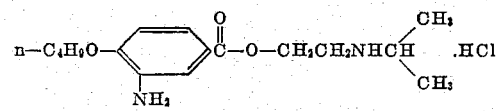

(a) 2-(benzylisopropylamino)ethanol is prepared by reductive alkylation of 2-(isopropylamino)ethanol with benzaldehyde in accordance with the procedure described heretofore and has a boiling point of 142.5–143° C. at a pressure of 22 mm. and a refractive index of $n_D^{25}$ 1.5110. On chemical analysis the said aminoethanol product is found to contain 74.63% C, 10.03% H, and 7.29% N, as compared with theoretical values of 74.57% C, 9.91% H, and 7.25% N.

(b) 2-(benzylisopropylamino)ethyl 3-nitro-4-n-butoxybenzoate hydrochloride is prepared by reacting 3-nitro-4-n-butoxybenzoyl chloride with 2-(benzylisopropylamino)ethanol in accordance with the procedure described in Example I(b), and has a melting point of 128–130° C. The said hydrochloride salt on chemical analysis is found to contain 60.20% C, 6.89% H, and 6.24% N, as compared with theoretical values of 60.47% C, 6.93% H, and 6.21% N.

(c) 2-(isopropylamino)ethyl 3-amino-4-n-butoxybenzoate hydrochloride is prepared by subjecting 2-(benzylisopropylamino)ethyl 3-nitro-4-n-butoxybenzoate hydrochloride to hydrogenation in the presence of palladium on carbon in the manner described in Example I(c). The reaction product melts at 143–144° C. and on chemical analysis is found to contain 58.19% C, 8.12% H, and 8.58% N, as compared with theoretical values of 58.08% C, 8.23% H, and 8.47% N.

EXAMPLE V

*2-(n-butylamino)ethyl 3-amino-4-n-butoxybenzoate hydrochloride*

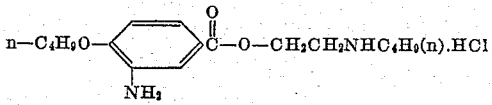

(a) 2-(benzyl-n-butylamino)ethyl 3-nitro-4-n-butoxybenzoate hydrochloride is prepared by reacting 3-nitro-4-n-butoxybenzoyl chloride with 2-(benzyl-n-butylamino)-ethanol as described heretofore.

(b) 2-(n-butylamino)ethyl 3-amino-4-n-butoxybenzoate hydrochloride is prepared by hydrogenation of 2-(benzyl-n-butylamino)ethyl 3-nitro-4-n-butoxybenzoate hydrochloride in the presence of palladium on carbon as described heretofore and has a melting point of 140–141° C. On chemical analysis the said product is found to contain 59.12% C, 8.69% H, and 8.12% N, as compared with theoretical values of 59.20% C, 8.47% H, and 8.12% N.

EXAMPLE VI

*2-(cyclohexylamino)ethyl 3-amino-4-n-butoxybenzoate dihydrochloride*

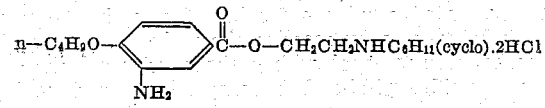

(a) 2-(cyclohexylbenzylamino)ethanol is prepared by reacting 2-(benzylamino)ethanol with cyclohexanone and thereafter subjecting the reaction product to hydrogenation in accordance with Example I. The product is found to have a boiling point of 207° C. at a pressure of 22 mm. and has a refractive index of $n_D^{25}$ 1.5287. On chemical analysis the said product is found to contain 77.34% C, 10.01% H, and 5.99% N, as compared with theoretical values of 77.20% C, 9.93% H, and 6.00% N.

(b) 2-(benzylcyclohexylamino)ethyl 3-nitro-4-n-butoxybenzoate hydrochloride is prepared by reacting 3-nitro-4-n-butoxybenzoyl chloride with 2-(benzylcyclohexylamino)ethanol as in Example I(b) to give a product having a melting point of 105–109° C. On analysis, the product is found to contain 5.63% N, as compared with a theoretical value of 5.85% N.

(c) 2-(cyclohexylamino)ethyl 3-amino-4-n-butoxybenzoate dihydrochloride is obtained by catalytically reducing the 3-nitro-4-n-butoxybenzoate product of Example VI(b) in the same manner as described in Example I(b). The said amino product melts at 211–212.5° C. with decomposition. On chemical analysis the said product is found to contain 56.26% C, 7.71% H, and 6.88% N, as compared with theoretical values of 56.01% C, 7.92% H, and 6.88% N.

EXAMPLE VII 3-(methylamino)-1-propyl 3-amino-4-n-butoxybenzoate hydrochloride

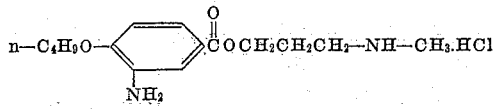

(a) 3-(benzylmethylamino)-1-propanol is prepared as in Example I(a) by reacting 3-(benzylamino)propanol with formaldehyde and reducing the reaction product in a hydrogen atmosphere. The product has a boiling point of 143–147° C. at a pressure of 11 mm. and a refractive index of $n_D^{25}$ 1.5216. On chemical analysis it is found to contain 73.96% C, 9.26% H, and 7.67% N, as compared with theoretical values of 73.70% C, 9.56% H, and 7.81% N.

(b) 3-(benzylmethylamino)-1-propyl 3-nitro-4-n-butoxybenzoate hydrochloride is prepared as in Example I(b) by reacting 3-nitro-4-n-butoxybenzoyl chloride with 3-(benzylmethylamino)-1-propanol to give a product having a melting point of 119–123° C. On chemical analysis the product is found to contain 60.69% C, 6.45% H, and 6.37% N, as compared with theoretical values of 60.50% C, 6.69% H, and 6.41% N.

(c) 3-(methylamino)-1-propyl 3-amino-4-n-butoxybenzoate hydrochloride is obtained by dissolving 13.5 g. (0.03 mole) 3-(benzylmethylamino)-1-propyl 3-nitro-4-n-butoxybenzoate hydrochloride in 75 cc. of water and 15 cc. of alcohol and subjecting the solution to hydrogenation under a pressure of 30 pounds per square inch in the presence of 1.5 g. of 5% palladium on charcoal. Upon purifying the hydrogenated product as in Example I(c), the desired salt, after recrystallization from propanol, melts at 156–158° C. On chemical analysis the product is found to contain 56.72% C, 7.75% H, and 8.78% N, as compared with theoretical values of 56.86% C, 7.95% H, and 8.84% N.

EXAMPLE VIII

3 - (cyclohexylamino) - 1 - propyl 3 - amino - 4 - n-butoxybenzoate dihydrochloride

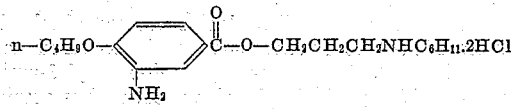

(a) 3-(cyclohexylcarbobenzoxyamino)-1-propanol is prepared by reacting 31.4 g. (0.2 mole) of 3-(cyclohexylamino)-1-propanol dissolved in 500 cc. of benzol and 50 cc. of dry ether and 20.2 g. (0.2 mole) of triethylamine with 34.1 g. (0.2 mole) of carbobenzoxy chloride which is added in small portions. Triethylamine hydrochloride begins to precipitate immediately. The mixture is warmed on a steam bath for several hours and filtered. After removing the solvent, the residue, comprising 3-(cyclohexylcarbobenzoxyamino)-1-propanol, distills at a temperature of 200–207° C. at a pressure of 6–7 mm. and has a refractive index of $n_D^{25}$ 1.5243. On chemical analysis the product is found to contain 70.08% C, 8.80% H, and 5.06% N, as compared with theoretical values of 70.06% C, 8.65% H, and 4.81% N.

(b) 3-(cyclohexylcarbobenzoxyamino)-1-propyl 3-nitro-4-n-butoxybenzoate hydrochloride is prepared by reacting 15 g. (0.053 mole) of 3-(carbobenzoxycyclohexylamino)-1-propanol with 0.053 mole of 3-nitro-4-n-butoxybenzoyl chloride as in Example I.

(c) 3-(cyclohexylamino)-1-propyl-3-amino-4-n-butoxybenzoate dihydrochloride is obtained by hydrogenating a solution of 10.2 g. (0.02 mole) 3-(carbobenzoxycyclohexylamino)-1-propyl 3-nitro-4-n-butoxybenzoate in 100 cc. of ethyl alcohol in the presence of 1.0 g. of 5% palladium on charcoal. After reduction is complete, the solution is filtered and 0.02 mole of alcoholic hydrochloride acid is added and the solution concentrated to dryness under reduced pressure. The residue is treated with acetone and filtered to yield the dihydrochloride salt having a melting point of 216° C. with decomposition. On chemical analysis the said salt is found to contain 57.40% C, 7.97% H, and 6.78% N, as compared with theoretical values of 57.69% C, 7.91% H, and 6.66% N.

EXAMPLE IX

1 - (methylamino) - 2 - propyl 3 - amino - 4 - n - butoxybenzoate hydrochloride

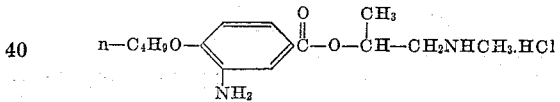

(a) 1-(benzylmethylamino)-2-propanol is prepared by reacting 1-(benzylamino)-2-propanol with formaldehyde and subjecting the reaction product to hydrogenation as in Example I(c). The product has a boiling point of 127–128° C. at a pressure of 13 mm. and has a refractive index of $n_D^{25}$ 1.5087. On chemical analysis the product is found to contain 73.80% C, 9.60% H, and 7.88% N, as compared with theoretical values of 73.70% C, 9.56% H, and 7.81% N.

(b) 1 - (benzylmethylamino) - 2-propyl-3-nitro-n-butoxybenzoate hydrochloride is prepared as in Example I(b) by reacting 3-nitro-4-n-butoxybenzoyl chloride in benzol with 1-(benzylmethylamino)-2-propanol and is found to have a melting point of 78–83° C. On chemical analysis the product is found to contain 6.23% N, as compared with a theoretical value of 6.41% N.

(c) The product, 1-(methylamino)-2-propyl 3-amino-4-n-butoxybenzoate monohydrochloride, is prepared as in Example I(c) by subjecting the 1-(benzylmethylamino)-2-propyl 3-nitro-4-n-butoxybenzoate hydrochloride to hydrogenation to give the product having a melting point of 138–140° C. On chemical analysis the product is found to contain 56.91% C, 7.78% H, and 8.99% N, as compared with theoretical values of 56.86% C, 7.95% H, and 8.84% N.

EXAMPLE X

1 - (n - propylamino) - 2 - propyl 3 - amino - 4 - n-butoxybenzoate dihydrochloride

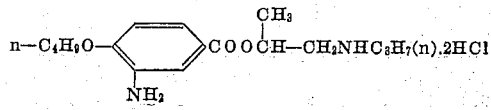

(a) 1-(benzyl-n-propylamino)-2-propanol is prepared by reductive alkylation of 1-(benzylamino)-2-propanol with propionaldehyde in accordance with the herein described procedure. The product boils at 141–143° C. at a pressure of 11 mm. and exhibits a refractive index of $n_D^{25}$ 1.5010. On chemical analysis the product is found to contain 75.12% C, 10.17% H, and 6.62% N, as compared with theoretical values of 75.31% C, 10.21% H, and 6.76% N.

(b) 1-(benzyl-n-propylamino)-2-propyl 3-nitro-4-n-butoxybenzoate hydrochloride is isolated as a thick viscous oil from the reaction of 3-nitro-4-n-butoxybenzoyl chloride with the product of Example X(a).

(c) 1-(n-propylamino)-2-propyl 3-amino-4-n-butoxybenzoate dihydrochloride is obtained by catalytic reduction of the product of Example X(b). The said dihydrochloride salt, after extensive drying, melts at 145–146° C. On chemical analysis the product is found to contain 53.58% C, 7.91% H, and 7.12% N, as compared with theoretical values of 53.53% C, 7.89% H, and 7.35% N.

EXAMPLE XI

*2-(n-propylamino)-1-butyl 3-amino-4-n-butoxybenzoate dihydrochloride*

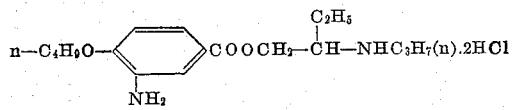

(a) 2-(benzyl-n-propylamino)-1-butanol is prepared by reductive alkylation of 2-(benzylamino)-1-butanol with propionaldehyde in accordance with the herein described procedure. The product boils at 162–167° C. at a pressure of 11 mm. and has a refractive index of $n_D^{26}$ 1.5052. On chemical analysis the product is found to contain 76.26% C, 10.39% H, and 6.53% N, as compared with theoretical values of 75.97% C, 10.47% H, and 6.33% N.

(b) 2-(benzyl-n-propylamino)-1-butyl 3-nitro-4-n-butoxybenzoate hydrochloride is prepared from the product of Example XI(a) in accordance with the previously described procedure and is obtained as a viscous oil.

(c) 2-(n-propylamino)-1-butyl 3-amino-4-n-butoxybenzoate dihydrochloride is obtained in 63% yield by catalytic reduction of the product of Example XI(b) in accordance with the herein described procedure. The said dihydrochloride salt melts at 206–208° C. with decomposition. On chemical analysis the product is found to contain 54.63% C, 8.15% H, and 6.88% N, as compared with theoretical values of 54.66% C, 8.16% H, and 7.09% N.

EXAMPLE XII

*2-(n-propylamino)ethyl 3-amino-4-ethoxybenzoate hydrochloride*

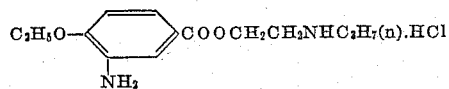

(a) 2-(benzyl-n-propylamino)ethanol, 29 g. (0.15 mole), is added to a benzene solution of 3-nitro-4-ethoxybenzoyl chloride (0.15 mole). The mixture is stirred and refluxed for two hours and allowed to stand overnight. The benzene is decanted from the solid mass of 2-(benzyl-n-propylamino)ethyl 3-nitro-4-ethoxybenzoate hydrochloride and this is then dissolved in hot alcohol from which it crystallizes on cooling. The product melts at 173–174° C. and on chemical analysis is found to contain 6.95% N, as compared with a theoretical value of 6.62% N.

(b) 2-(benzyl-n-propylamino)ethyl 3-nitro-4-ethoxybenzoate hydrochloride, 4.0 g. (0.095 mole), is hydrogenated in 150 cc. of absolute alcohol in the presence of 4 g. of 5% palladium on charcoal. After reduction, the alcoholic solution is added to dry ether and the hydrochloride salt is isolated. The 2-(n-propylamino)ethyl 3-amino-4-ethoxybenzoate hydrochloride product melts at 152.5° C. and on chemical analysis is found to contain 55.46% C, 7.80% H, and 9.19% N, as compared with theoretical values of 55.54% C, 7.67% H, and 9.26% N.

EXAMPLE XIII

*2-(n-butylamino)ethyl 3-amino-4-ethoxybenzoate hydrochloride*

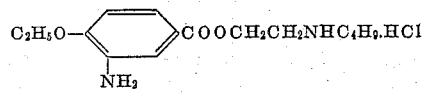

(a) 2-(benzyl-n-butylamino)ethyl 3-nitro-4-ethoxybenzoate hydrochloride is prepared by reacting 3-nitro-4-ethoxybenzoyl chloride (0.15 mole) and 2-(benzyl-n-butylamino)ethanol (0.15 mole) as in Example XII(a). The product is isolated as a solid, melting at 128–129° C. and on chemical analysis is found to contain 60.24% C, 6.94% H, and 6.38% N, as compared with theoretical values of 60.50% C, 6.69% H, and 6.41% N.

(b) The nitro ester hydrochloride product of Example XIII(a) is hydrogenated as previously described and isolated as in Example XII(b). The 2-(n-butylamino)ethyl 3-amino-4-ethoxybenzoate hydrochloride product melts at 136–137° C. and on chemical analysis is found to contain 56.89% C, 8.18% H, and 8.63% N, as compared with theoretical values of 56.86% C, 7.95% H, and 8.85% N.

EXAMPLE XIV

*2-(ethylamino)ethyl 3-amino-4-n-propoxybenzoate hydrochloride*

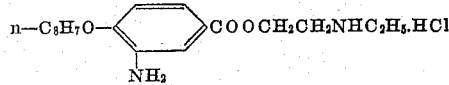

(a) 3-nitro-4-n-propoxybenzoyl chloride is reacted with 2-benzylethylamino)ethanol in the manner described in Example XII (a) to yield 2-(benzylethylamino)ethyl 3-nitro-4-n-propoxybenzoate hydrochloride as a solid which melts at 166–167° C. On chemical analysis the product is found to contain 59.48% C, 6.49% H, and 6.37% N, as compared with theoretical values of 59.64% C, 6.44% H, and 6.62% N.

(b) The nitro ester hydrochloride product obtained in Example XIV(a) is hydrogenated and recovered as in Example XII(b). The 2-(ethylamino)ethyl 3-amino-4-n-propoxybenzoate hydrochloride product thus obtained melts at 124–125° C. and on chemical analysis is found to contain 55.42% C, 7.80% H, and 8.96% N, as compared with theoretical values of 55.54% C, 7.67% H, and 9.26% N.

EXAMPLE XV

*2-(n-propylamino)ethyl 3-amino-4-n-propoxybenzoate hydrochloride*

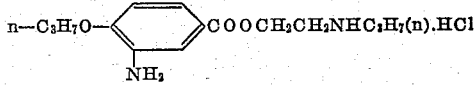

(a) 3-nitro-4-n-propoxybenzoyl chloride is reacted with 2-(benzyl-n-propylamino)ethanol in the manner described in Example XII(a) to yield 2-(benzyl-n-propylamino)ethyl 3-nitro-4-n-propoxybenzoate hydrochloride which melts at 117–119° C. On chemical analysis the product is found to contain 60.01% C, 6.66% H, and 6.71% N, as compared with theoretical values of 60.50% C, 6.69% H, and 6.41% N.

(b) The nitro ester hydrochloride product obtained in Example XV(a) is hydrogenated and recovered as in Example XII(b). The 2-(n-propylamino)ethyl 3-amino-4-n-propoxybenzoate hydrochloride product thus obtained melts at 140.5–142° C. and on chemical analysis is found to contain 56.73% C, 8.16% H, and 8.65% N, as compared with theoretical values of 56.86% C, 7.95% H, and 8.48% N.

EXAMPLE XVI 2-(tertiaryoctylamino)ethyl 3-amino-4-ethhoxybenzoate dihydrochloride

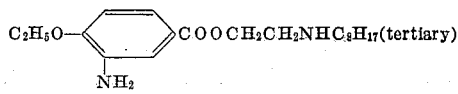

(a) 2 - (benzyltertiaryoctylamino)ethanol: Tertiaryoctylamine is reductively alkylated with benzaldehyde as described heretofore to produce N-benzyltertiaryoctylamine which boils at 156–157° C. at a pressure of 21 mm. and has a refractive index of $n_D^{25}$ 1.4976. The said octylamine is then reacted with ethylene oxide for 24 hours at 150° C. The reaction mixture is distilled and 2-(benzyltertiaryoctylamino)ethanol boiling at 188–192° C. at a pressure of 10 mm. is obtained, having a refractive index of $n_D^{25}$ 1.5103.

(b) 2 - (benzyltertiaryoctylamino)ethyl 3 - nitro - 4-ethoxybenzoate hydrochloride: 20 g. (0.076 mole) of 2-(benzyltertiaryoctylamino)ethanol is reacted with 0.076 mole of a benzol solution of 3-nitro-4-ethoxybenzoyl chloride as in Example XV(a) and 2-(benzyltetriaryoctylamino)ethyl 3-nitro-4-ethoxybenzoate hydrochloride is obtained as a viscous mass which gradually solidifies on treatment with alcohol and ether and melts at a temperature of 94–97° C.

(c) 2 - (tertiaryoctylamino)ethyl 3 - amino - 4-ethoxybenzoate dihydrochloride: The nitro ester hydrochloride, 34.4 g. (0.07 mole), described in Example XVI(b) is hydrogenated in warm alcohol in the presence of 5% palladium on carbon. The reaction mixture is filtered after completion of reduction and is treated with 0.07 mole of alcoholic hydrochloric acid solution. The product is isolated in good yield as the dihydrochloride and melts at a temperature of 144–146° C. with decomposition after recrystallization from isopropanol.

It will be evident from the foregoing specific examples that monoalkylaminoalkyl lower alkoxy amino benzoate compounds having the general formula:

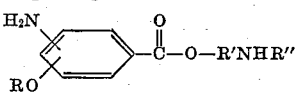

wherein R is a lower alkyl group, R′ is a bivalent lower hydrocarbon radical, and R″ is a lower alkyl group, can be prepared by reacting an alkanol having the general formula:

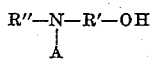

where R′ and R″ have the above defined values and A is a hydrogenolyzable group selected from the group consisting of benzyl, benzhydryl, α-menaphthyl, β-menaphthyl, carbobenzoxy, carbo-allyloxy, and halocarbobenzoxy, with a benzoic acid acylating agent having the general formula:

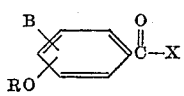

where R is a lower alkyl group, B is selected from the group consisting of the nitro and the amino groups, and X is a halogen atom or a lower alkoxy group to form an ester having the general formula:

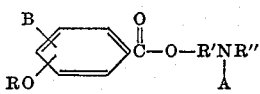

where A, B, R, R′, and R″ have the above defined values, and thereafter subjecting the said ester to a hydrogen reducing atmosphere to remove the said hydrogenolyzable group, and recovering the said monoalkylaminoalkyl ester compound uncontaminated by amide products. Where the said ester compound is recovered initially in the form of an acid addition salt, it can be readily converted to the base form simply by treating the said salt with an alkaline reagent, such as sodium hydroxide, and recovering the free base in the usual manner.

It should also be understood that in addition to the foregoing monoalkylaminoalkyl 3 - amino - 4 - lower alkoxybenzoates, other monoalkylaminoalkyl amino lower alkoxybenzoates have properties similar to those compounds heretofore described and including the isomeric compounds 2 - (n-propylamino)ethyl 3-ethoxy-4-aminobenzoate hydrochloride, 2-(n-butylamino)ethyl 3-ethoxy-4-aminobenzoate hydrobromide, 2-(ethylamino)ethyl 3-n-butoxy - 4 - aminobenzoate hydrochloride, and 2-(ethylamino)ethyl 3-n-propoxy-4-aminobenzoate hydrobromide.

The compounds of the present invention, and particularly the water solube non-toxic salts of the bases, such as the hydrochlorides, the hydrobromides, the sulfates, and the nitrates, are useful as a local anesthetic in several pharmaceutical forms, including sterile solutions for irrigation, intravenous administration, or subcutaneous injection, and dispersions thereof in an oil, emulsion, a jelly, or cream base, either alone or in combination with other therapeutic agents, such as antihistamines, sulfa drugs and the antibiotics.

Typical useful pharmaceutical formulations of the compounds of the present invention are illustrated by the following:

EXAMPLE XVII

2 - (ethylamino)ethyl 3 - amino - 4 - n - butoxybenzoate hydrochloride_____percent__ 1
Benzyl alcohol_____do____ 0.9
Water for injection_____ q. s.

EXAMPLE XVIII

2 - (ethylamino)ethyl 3 - amino - 4 - in - propoxybenzoate hydrochloride_____percent__ 1
Methocel _____do____ 4.25
Propylene glycol_____do____ 20
Distilled water_____ q. s.

EXAMPLE XIX

2 - (n - propylamino)ethyl 3 - amino - 4 - n - propoxybenzoate hydrochloride_____percent__ 1
Propylene glycol_____do____ 57
Carbowax 6000_____do____ 42

EXAMPLE XX

An isotonic solution containing one-half percent by weight of the compound 2-(ethylamino)ethyl 3-amino-4-n-butoxybenzoate hydrochloride when administered to the human eye produces very profound and rapid anesthesia with a minimum of discomfort.

It is also possible to use the compounds of the present invention in troches and lozenges or to dispense the compounds as a dry powder suitable for admixing in a pharmaceutical carrier immediately prior to administration.

Others may readily adapt the invention for use under various conditions of service, by employing one or more of the novel features disclosed or equivalents thereof. As at present advised with respect to the apparent scope of our invention, we desire to claim the following subject matter.

We claim:

1. A mono lower alkylamino lower hydrocarbon ester of 3-amino-4-lower alkoxy benzoic acid, having the general formula:

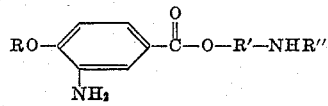

wherein R is a lower alkoxy group, R' is a lower alkylene group, and R" is a lower alkyl group, said lower alkyl and lower alkoxy groups having between one and eight carbon atoms and the said lower alkylene group having between two and eight carbon atoms.

2. The compound 2-(n-propylamino)-1-butyl 3-amino-4-n-butoxybenzoate dihydrochloride.

3. The compound 2-(n-propylamino)ethyl 3-amino-4-ethoxybenzoate hydrochloride.

4. The compound 2-(n-butylamino)ethyl 3-amino-4-ethoxybenzoate hydrochloride.

5. The compound 2-(tertiaryoctylamino)ethyl 3-amino-4-ethoxybenzoate dihydrochloride.

6. The compound 1-(methylamino)-2-propyl 3-amino-4-n-butoxybenzoate hydrochloride.

References Cited in the file of this patent

UNITED STATES PATENTS

| 1,317,250 | Wildman | Sept. 30, 1919 |
| 2,288,334 | Vliet et al. | June 30, 1942 |
| 2,363,081 | Ringk | Nov. 21, 1944 |

FOREIGN PATENTS

| 728,527 | Great Britain | Apr. 20, 1955 |

OTHER REFERENCES

Pierce et al.: J. Am. Chem. Soc., 64, 1691 to 1694 (1942).

Epstein et al.: J. Am. Chem. Soc., 77, 4059 to 4061 (1955).